United States Patent [19]
Cottin et al.

[11] 3,886,515
[45] May 27, 1975

[54] AUTOMATIC VEHICLE-MONITORING SYSTEM

[75] Inventors: Jean Cottin; Jean Laxaque, both of Paris, France

[73] Assignee: Thomson-CSF, Paris, France

[22] Filed: May 24, 1973

[21] Appl. No.: 363,729

[30] Foreign Application Priority Data
May 26, 1972 France .............................. 72.18883

[52] U.S. Cl. ............................. 340/23; 235/150.2
[51] Int. Cl. ............................................. G08g 1/12
[58] Field of Search ...... 235/150.2, 150.24; 340/22, 340/23, 24, 31 R, 32, 33, 38 R, 38 L

[56] References Cited
UNITED STATES PATENTS

| | | | |
|---|---|---|---|
| 3,004,258 | 10/1961 | Cohen et al. .......................... | 340/23 |
| 3,231,854 | 1/1966 | Gran ...................................... | 340/32 |
| 3,550,078 | 12/1970 | Long ...................................... | 340/32 |
| 3,560,916 | 2/1971 | Buckingham et al. ................. | 340/23 |
| 3,568,161 | 3/1971 | Knickel .................................. | 340/24 |
| 3,644,883 | 2/1972 | Borman et al. ....,.................... | 340/23 |
| 3,757,290 | 9/1973 | Ross et all. ........................... | 340/23 |
| 3,780,272 | 12/1973 | Rohner ................................. | 235/150.2 |

*Primary Examiner*—Kathleen H. Claffy
*Assistant Examiner*—Randall P. Myers
*Attorney, Agent, or Firm*—Karl F. Ross; Herbert Dubno

[57] ABSTRACT

A plurality of public-transport surface vehicles such as buses, each identified by an individual number, are equipped with transmitters for sending out that identification number together with heading and positional data conveying information on direction of travel and momentary distance from a point of departure; the transmitted information may also indicate the state of occupancy of the vehicle. This information is received at transit points along the route, each transit point including circuits for determining from the directional and distance data the distance of an approaching vehicle from that point. If the transit point is a passenger station, the shortest vehiclular distance or distances are registered with the accompanying identification and occupancy data in one or more stores for display to waiting passengers. The directional and distance data can also be intercepted by a traffic-control post to detect the approach of vehicles at an intersection as an aid in the operation of traffic lights. The data-evaluating equipment at any such transit point includes a comparator determining whether a newly arriving signal is from a vehicle whose data have already been registered in a store thereof, i.e. whether the transmitting vehicle is among those closest to that point at the instant of reception.

15 Claims, 6 Drawing Figures

AUTOMATIC VEHICLE-MONITORING SYSTEM

BACKGROUND OF THE INVENTION

The present invention relates to an automatic traffic-monitoring system for displaying and exploiting data pertaining to vehicles passing predetermined points. It relates more particularly but not exclusively to public-transport vehicles.

The increasingly difficult traffic situation encountered in particular in large towns, which have public surface-transport lines, means that any trip, especially at peak hours, becomes something of a gamble for the rider.

In fact, a public-transport user waiting for a bus at a bus stop does not generally know how long he is going to have to wait before a bus arrives at the stop, and even less does he know whether or not there will be any room on the vehicle when it eventually does arrive. The waiting problem and the problem of the available space are therefore factors of increasing importance and nowadays constitute a source of nuisance for the user, and this is a situation which can only get worse in the future.

We are not aware of any measures taken heretofore to enable the user of public surface-transport to make a decision, under given circumstances, as to what attitude to adopt when he is considering taking a ride. Should he wait for a bus and, if he decides to wait, will he be able to get on board when it arrives? Moreover, if the two aforementioned conditions are satisfied, how long will he have to wait at the stop where he is in order to be able to utilize this transport facility?

This simple expose of the problem shows how vital it is that users should be provided at predetermined points, e.g. at bus stops, with all the information about public-transport vehicles running on the route defined by these stops, or at any rate about the two or three vehicles most likely to arrive at the stop in question within a reasonable period of time.

Knowledge of this kind of information, relating to the distance at which these vehicles are located from the point where the information is displayed, as well as to the number of places available, determines the reaction of the user who, depending upon the situation, waits at the stop for the vehicle which has been announced or decides to choose some other means of transportion which he considers better suited to the existing traffic conditions.

OBJECTS OF THE INVENTION

An object of the present invention is to provide a system for automatically displaying, at predetermined monitoring points defining a public-transport route, data pertaining to the location of vehicles along the route as well as the number of available places which they have to offer.

The most suitable monitoring points at which this display should be provided would be the stops. However, the information concerning the location of one or more vehicles may also be utilized within the framework of a broader program in order to regulate the overall traffic flow in the urban network. In particular, it might be translated into a certain action pertaining to the control of traffic lights, since the tendency of public-authorities is to give priority to public transport vehicles.

Another object of our invention, therefore, is to provide means for controlling the traffic lights of a surface-transportion system by the information pertaining to the distance of a vehicle from such lights.

SUMMARY OF THE INVENTION

In an automatic data-evaluation system according to our invention, a vehicle passing successive transit points along a predetermined route intermittently transmits heading and positional data pertaining to its direction of travel and to the distance Dv separating that vehicle from a fixed reference point, its identification number, and occupancy data indicating its degree of loading state or number of available places, each transit point comprising arithmetic means for calculating the vehicular distance De from the first-mentioned distance (Dv) and from locally supplied data giving the fixed distance (Ds) of that particular transit point from the reference point. If the received heading data and the sign of the vehicular distance (De) indicates that the vehicle is moving toward the transit point, the approach of the vehicle is revealed by output means which may cause the magnitude of the vehicular distance (De) to be locally displayed along with other data pertaining to the vehicle; that magnitude may also be compared with a fixed reference distance (Da) characteristic of the same transit point but differing from the first distance (Ds), the result of the latter comparison triggering the generation of a signal (such as the operation of a traffic light) if the vehicular distance (De) is less than the fixed reference distance (Da).

BRIEF DESCRIPTION OF THE DRAWING

The above and other features of the invention will become apparent during the course of the ensuing description of a representative embodiment of an improved traffic-control system, given with reference to the accompanying drawing in which.

As already mentioned, the system according to our invention automatically provides for users of public transport, waiting for a vehicle at a stop for example, both the current position of the nearest vehicles moving toward the stop, or of several of such vehicles, and the number of seats available thereon. These data are preferably transmitted by radio at a rate such that the users can follow the development of the situation on their route, at least upstream of the point at which they are waiting. These data appear on display devices.

However, at certain points on the route, in particular at intersections, the data are not displayed for use by the passengers but, and this applies in particular to the distance at which the vehicle is located, are utilized to influence the control of the traffic lights at these intersections.

The transmitted data generally include the vehicle number, the distance at which the vehicle is located from a fixed point which may be its point of departure at the commencement of the route, as will be assumed in the ensuing description, and its load, that is to say the number of people on board or the number of seats available. The vehicle V (FIG. 2) must therefore be equipped with means for acquiring this information and transmitting it; the equipment used for this purpose includes a transmitting antenna 101 and a conventional odometer 102 measuring the traveled distance Dv.

The automatic system for presenting data pertaining to vehicles, that is to say the system in accordance with the invention, replies to a message transmitted by the vehicles in question. This message, as already explained, comprises the identification number of the vehicle, the distance which it has traveled from its point of departure, and the number of places available in it. There is added a synchronization word identifying the message, and security data referred to as parity bits in the case where the message is expressed in a binary code, as will generally be the case.

This message is transmitted by radio so that a carrier frequency has to be used. In principle, all the vehicles concerned will transmit at the same frequency either in response to a call from a central station, or in an independent fashion; it has to be accepted in the case of independent transmission that there will be some slight interference because if two vehicles transmit simultaneously, their transmissions will be superimposed and the results will be incapable of utilization at the receiving end. In fact, the period of triggering of transmissions, that is to say the time interval separating two successive transmit commands from one and the same vehicle, is random, varying between the time zero and a maximum time T. This random nature of the signaling period reduces the probability of consistent overlap of transmissions coming from different vehicles.

The optimum value of the maximum time T is given by a probability calculation as a function of the duration of the message from each vehicle, and of the number of vehicles. If we assume a number of vehicles of around thirty, and a message duration on the order of 50 milliseconds, the optimum value of the maximum time T will be around five seconds. This gives a probability of 99 % that every thirty seconds a message will be received from a vehicle which is undisturbed by transmissions from other vehicles, and a probability of 80 % that an undisturbed message will be received every ten seconds.

Our invention, nevertheless, is equally applicable to systems with a considerably larger number of vehicles. In this case, the vehicles would not transmit independently, and therefore in a random way, but would transmit their messages in accordance with a predetermined program or on interrogation by a central station.

Figure 1:
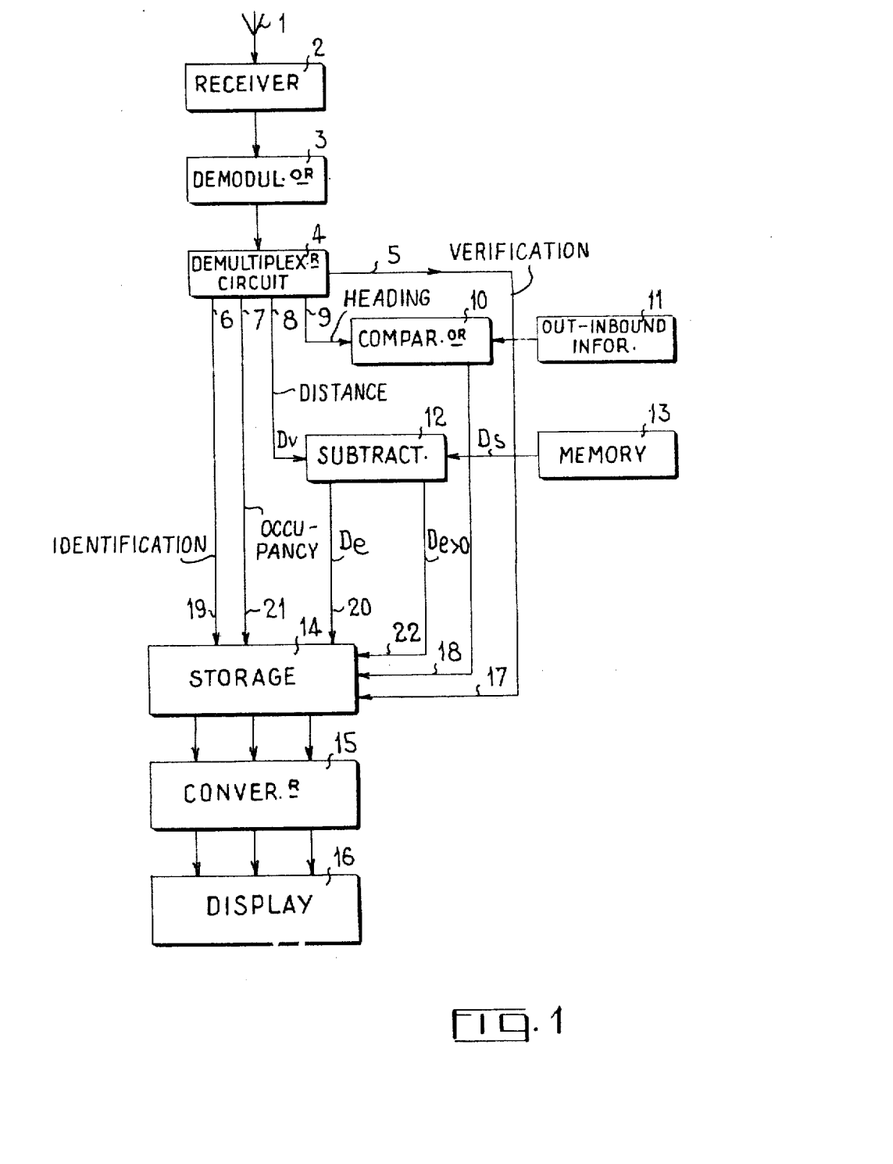
FIG. 1 is a schematic illustration of the equipment at a station designed to display vehicular data.

FIG. 1 illustrates a block diagram of equipment in accordance with the invention, installed at a fixed point or station where the vehicles halt, for making available data of significance to the users of a public-transport route. This equipment comprises a receiving antenna 1 connected to a receiver 2 which feeds a demodulator 3 connected to a demultiplexer circuit 4. The receiver, generally, will be permanently tuned in on the frequency utilized by the vehicular transmitters. The antenna can be of any conventional kind, e.g. a whip antenna, with an effective pick-up in the geographic zone in which the route taken by the vehicle is located. The demodulator 3 is designed to reconstitute in digital form the messages received from the vehicles, which have been superimposed upon a carrier by frequency, phase or amplitude modulation.

The demodulator 3 thus furnishes a signal which is a series of binary states, the demultiplexer 4 is rendered operative by the synchronization word validating the message and analyzes the full message which it reads out in parallel if the parity check has not revealed any error.

The demultiplexing of the received message may be carried by series-parallel registers supplied with the received signal after filtering.

The detection of the presence of a synchronization word, preceding any message, triggers the step-by-step storage of the message in the register, at a clock frequency also utilized at the transmitting end during the formation of the message. As the message is registered, a monitoring circuit checks the validity of the parity bits character by character.

At the end of the message as determined by the number of bits registered, if the parity check has not revealed any error, the message stored in the registers is transferred en bloc into parallel stores which retain the data until the arrival of the next message. This demultiplexer thus comprises several outputs 5–9 at which different data appear. At the output 5 a verification signal appears indicating that the message received and demultiplexed is correct. At the output 6 a signal appears indicating the number of the vehicle originating the received and analyzed message. At the output 7 a signal appears which indicates the current occupancy of the vehicles, that is to say for example the number of occupied or available seats, whereas at the output 8 there appears a signal Dv indicating the distance traveled by the vehicle in question from a fixed reference point, here its point of departure at the start of the route; output 9 delivers a heading or route signal, which indicates the direction in which the vehicle in question is moving along the route.

The information pertaining to the direction of travel is introduced into a comparator circuit 10 where it is compared with data coming from a circuit 11 which, in a coded form similar to that of the route data, contains information pertaining to the direction being followed by the vehicle coming to the station, for example information as to whether the station in question is on the "outbound" or the "inbound" side. If the comparison is positive, the comparator 10 emits a signal indicating that the direction of travel of the vehicle is compatible with the station which has picked up the message.

The signal appearing at the output 8 of the demultiplexer 4, here representing the distance Dv traveled by the vehicle since its departure from the origin of the route, is applied to a subtracting circuit 12 which subtracts it from a value Ds received from a memory 13, i.e. a constant parameter representing the distance between the origin of the line and the station in question.

Figure 2:
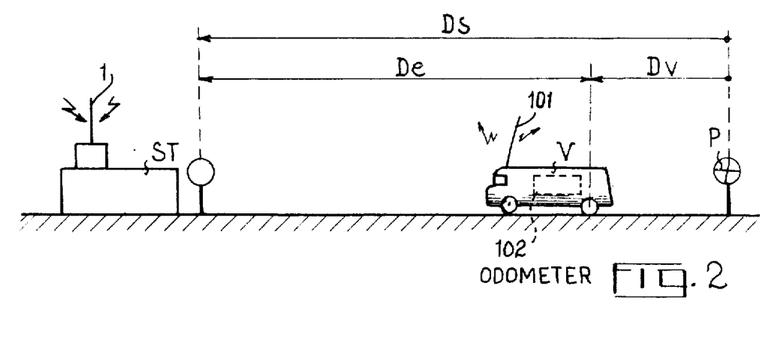
FIG. 2 is a graph indicating the various data referred to in connection with FIG. 1.

FIG. 2 indicates how these distances are determined, in the case described here, which reference to the origin P of the route, a station ST and a vehicle V.

The signal supplied by the subtraction circuit 12, namely De, consequently represents the distance at which the vehicle V is located from the station ST toward which it is traveling and where the message transmitted by the vehicle is to be displayed.

The various items of information, namely that indicating a correct message (coming from the output 5 of the demultiplexer 4), that indicating the identification number of the vehicle from which the message has been received (supplied by output 6), that indicating the vehicle load (supplied by output 7), that indicating the direction of travel along the route (coming from output 10) and that giving the distance De (coming from output 12), are transmitted to a classification and storage circuit 14. This circuit 14 is moreover supplied with an additional item of information from the subtracting device 12, pertaining to the sign of the distance De which should normally be positive in the situation here envisaged, in order for the message picked up to be cleared for display. In fact a positive value of De indicates that the vehicle is upstream of the station ST, i.e. between that station and the terminus P. A negative value of De would indicate that the vehicle had passed the station; the message would then no longer be of any interest and would by rejected by the station ST.

The data transmitted by the vehicle and relating to the load could be:

the number of seats available, in which case the data can be utilized directly; or the number of places occupied as a fraction 1/p of the maximum capacity of the vehicle, in which case the station equipment would determine the number of available places in terms of that capacity by calculating the complement 1-1/p of the data received; or the number of places occupied, as an absolute value, in which case, if the vehicles do not all have the same capacity, it is necessary to know the capacity of the vehicle transmitting the message. This supplementary piece of information would be carried by the message. By carrying out a subtraction operation the station equipment would deduce the number of available places which could then be displayed in the form of an absolute or a relative value.

In the description which follows, we shall confine ourselves to the case in which the number of available places is transmitted with the message, and FIG. 1 pertains to this case. However, the two other alternatives involve only minor modifications of the system of FIG. 1, not material to the invention and not described in any detail here.

The classification and storage circuit 14 is designed to sort the data so that only those are stored and displayed which are of immediate interest to the users waiting at a station.

In fact, a station is capable of picking up messages coming from a certain number of vehicles approaching it or for that matter traveling away from it. It is clear that not all these messages have the same degree of interest since they emanate from vehicles whose distances from the station are different.

Several cases can arise which will be described with the help of FIG. 3, the latter providing a schematic illustration of the classification and storage circuit 14.

In the example described, this circuit comprises two stores only, 26 and 29, so that two messages coming from two different vehicles can be processed quasi-simultaneously.

These stores, by way of example, may be constituted by magnetic-ring arrays, electronic trigger stages, shift registers, or the like.

The input leads of circuit 14 are marked by the same references as in FIG. 1, including a lead 17 for a verification signal from demultiplexer output 5, indicating the presence of a correct message, and a lead 18 for a confirmation signal from comparator 10, pertaining to the proper direction of travel, the simultaneous presence of these input signals being manifested by an output signal from an AND-gate 23 which combines them; a lead 19 tied to demultiplexer output 6 delivers the number of the originating vehicle, a lead 20 coming from subtractor 12 supplies the distance De, a lead 21 connected to demultiplexer output 7 indicates the number of places available on the vehicle, and a lead 22 also emanating from subtractor 12 carries the sign of the distance De. Comparator 10 and gate 23 form part of a discriminating circuit ascertaining from the heading data on lead 9 whether the transmitting vehicle follows a particular route assigned to storage circuit 14.

The input leads 19 to 21 are connected to a gate 34 controlled by the data pertaining to the sign of De, this gate switching them through to one of the stores 26, 29. Access to these stores is selectively given by respective AND-gates 25 and 27 in accordance with certain conditions.

Thus, with each of the stores there are associated two comparator circuits 30, 31 and 37, 38. The task of the comparator 30, connected between lead 19 and a read-out lead 26' of store 26, is to check whether the identification number of the transmitting vehicle is or is not that of a vehicle from which a message has already been registered before in store 26. If the new and registered numbers coincide, a signal blocking the store 29 is transmitted to the AND-gate 27 through an inverter 41. The comparator 31, connected between lead 20 and a read-out lead 26'' of store 26, compares the distance De of the transmitting vehicle, with the distance $De_1$ of a vehicle whose message has already been registered (cf. FIG. 4). This comparison produces a positive result if the distance De is less than the distance $De_1$, indicating that the arriving message comes from a vehicle closer to the station than the vehicle previously heard from. An AND-gate 33 combines the signal coming foom the comparator 31 and the signal on lead 22 indicating the sign of De. Their common presence results in the application of a signal to an OR-gate 32 which energizes one of the inputs of the AND-gate 25 controlling access to the store 26, the other input of this AND-gate being connected to the output of AND-gate 23 through a delay circuit 24 imparting a delay ob ½t. The time t represents the duration of a timing pulse applied to the input 17 as a vertification signal indicating that the parity test has produced a positive result.

The other inputs of the OR-gate 32 respectively receive the output signal of comparator 30 and the data pertaining to the loading of the store 26, the latter information being transmitted through an inverter 36.

The circuits associated with the second store 29 are similar to those described with reference to the store 26. An arriving message is first processed in the circuits associated with the first store 26, then offered to those of the store 29 after a delay on the order of 2t in a second-stage delay circuit 28 receiving the output of the first-state delay circuit 24.

Thus, the components of the second half of circuit 14 include, besides the comparators 37 and 38, an inverter 42, an AND-gate 39, an OR-gate 44 and an AND-gate 27 corresponding respectively to inverter 36 and to the gates 33, 32 and 35. However, an additional AND-gate 43 has been included, which is in cascade with an OR-gate 47 also energizable from gate 27. AND-gate 43, receiving the outputs of comparators 30 and 37 in addition to that of delay circuit 28, conducts when a second vehicle has overtaken a vehicle which was previously in front of it. Comparators 37 and 38 are connected between leads 19 and 20, on the one hand, and respective read-out leads 29', 29'' of the store 29, on the other hand.

Figure 3:
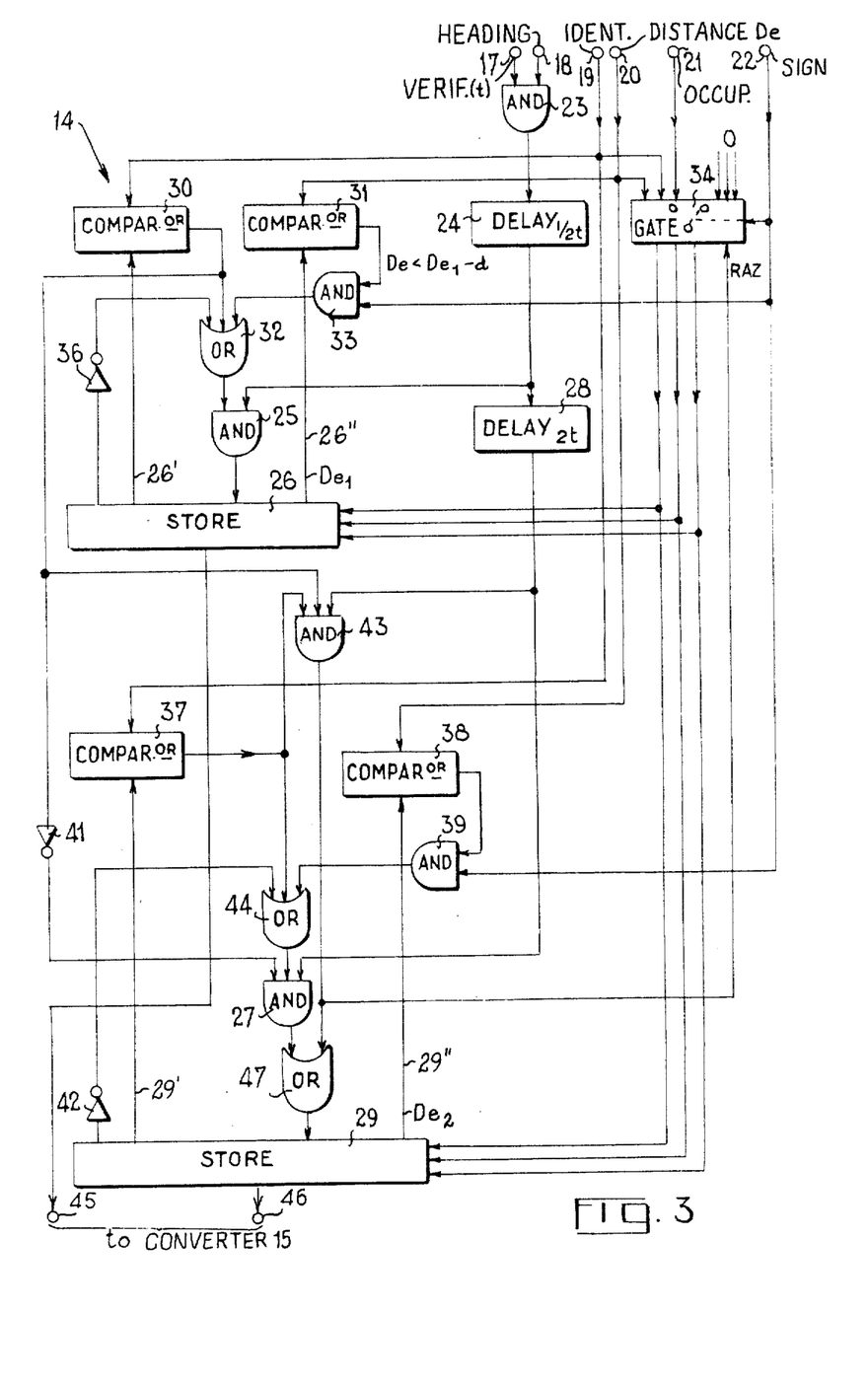
FIG. 3 is a schematic illustration of classification and storage circuitry included in the system.
Figure 4:
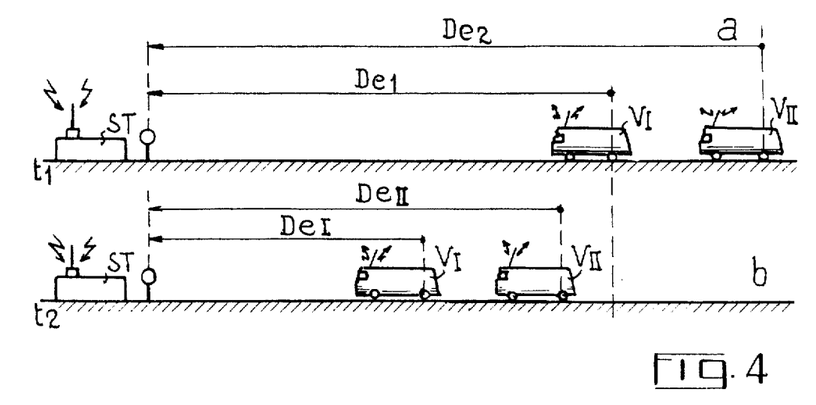
FIG. 4 is a graph indicating a particular arrangement of the data pertaining to FIG. 3.

The operation of the circuits described in the foregoing is as follows:

Let us assume that messages are received from two vehicles moving toward the station in question, the closer one of the two being at a distance $De_1$ and the other being at a distance $De_2$ (cf. FIG. 4). Under these conditions, the store 26 registers data from the first vehicle and the store 29 registers data from the second vehicle.

An arriving message is then recived from the vehicle located at the distance $De_1$ from the station.

In a first instance, we will assume that the stores are empty. The arriving message from a vehicle located at distance $De_1$ is recorded in the store 26, the AND-gate 25 being conductive on reception of a signal indicating the unloaded state of the store 26, through the OR-gate 32, and of a signal from the AND-gate 23. This message, however, cannot be entered in the store 29 which is blocked at this time by a preference circuit including delay means 28 and inverter 41.

A subsequently arriving message coming from the second vehicle cannot then be registered in the store 26 which is loaded (signal inverted at 36), because there is lack of coincidence between the vehicle numbers fed to comparator 30 and because the distance $De_2$ of the second vehicle is greater than the previously registered distance $De_1$ as determined by the comparator 31. However, this second message is picked up by the store 29, which is still empty.

Upon such loading of both stores 26 and 29, the store 26 will contain the message from the first vehicle located at the shorter distance $De_1$, and the store 29 will contain the message from the second vehicle located at the greater distance $De_2$.

A further message from the first vehicle gives a distance De smaller than both $De_1$ and $De_2$.

This message is entered in the store 26 because certain access conditions are satisfied:

identity of the vehicle numbers in comparator 30, new distance De positive and less than stored distance $De_1$, so that the AND-gate 33 is made conductive along with AND-gate 25. The gate 34, rendered conductive by the sign information De > 0, allows data concerning the vehicle to pass to the store 26 in order to update its contents.

On the other hand, this message cannot be picked up by the store 29 because, in the absence of nonidentity of the vehicular identification numbers, one input of AND-gate 27 is de-energized by inverter 41. Furthermore, there is no identity between the vehicle from which the message is coming and the one whose data are registered in the store 29, as determined by comparator 37.

Let us now consider the arrival of a message from the second vehicle with $De_1 < De < De_2$.

This message cannot be picked up by the store 26 since there is no identity between the vehicle numbers, the store 26 being assigned to the first vehicle, and since the distance De is greater than the distance $De_1$ previously entered in that store.

This message is instead picked up in the store 29 since there is now identity between the identification numbers fed to compartor 37, non-identity with the vehicle assigned to store in 26 so that inverter 41 conducts, and a distance De less than distance $De_2$ as established by comparator 38. The data arriving through the gate 34, open because of the positive sign of De, are then entered in the store 29.

A third situation exists in the case where the second vehicle overtakes the first. In this case, the relative magnitudes of the distances $De_2$ and $De_1$ are modified and after the second vehicle has passed the first vehicle, its data will be received by the store 26 and no longer by the store 29.

If a message from the first vehicle arrives, and the system is still unaware that this vehicle has been overtaken, its new distance $De_1$ will be entered in the store 26 in accordance with the process already described.

At the instant at which a message arrives from the second, overtaking vehicle, the distance De of the latter will be less than both stored distances $De_1$ and $De_2$.

This distance De is then picked up by the store 26 and likewise by the store 29 since there is nothing to prevent this, the AND-gate 43 being conductive. However, the signal coming from the alternate access gate 43 is transmitted to the gate 34 by a reset conductor RAZ. A signal is then transmitted to the store 29 which is cleared. Data will again be entered in this store upon the occurrence of a new message from the overtaken vehicle which will then in fact have assumed the place of the second vehicle.

The comparators 31 and 38 operate virtually simultaneously. This may be a source of nuisance in the case of two closely spaced vehicles whose messages are picked up by the station.

In FIG. 4(a) we have shown the positions of two vehicles $V_I$ and $V_{II}$ at an instant $t_1$ at which the vehicle $V_I$ is transmitting a message indicating its position. The distance of the vehicle $V_I$ from in relation to station ST has the value $De_1$ at that instant $t_1$.

If these vehicles are the ones closest to the station, the message coming from vehicle $V_I$ will be registered in the store 26 and that from vehicle $V_{II}$ will be entered in the store 29.

The vehicle $V_{II}$ in turn transmits its message at an instant $t_2$ when the new distances are $De_I$ in the case of the vehicle $V_I$ and $De_{II}$ in the case of the vehicle $V_{II}$, as shown in FIG. 4(b).

It may happen that at this instant $t_2$ the distance $De_{II}$ is less than the distance $De_1$ of the first vehicle, which was stored at the instant $t_1$, even though the distance of the front vehicle from station ST at this time is $De_I < De_{II}$.

Upon reception at the instant $t_2$ the station equipment including comparator 31 will therefore mistakenly conclude that vehicle $V_{II}$ has passed vehicle $V_I$.

To avoid this false deduction, the circuit 31 comparing the vehicular distances in the station equipment operates with a threshold $d$. It is concluded that overtaking has happened, if $De_{II}$ is less than $De_1 - d$.

The value $d$ will be chosen as a function of the maximum duration separating the reception of messages from one and the same vehicle by the station, and as a function of the maximum speed of the vehicles over the route in question.

The stores 26 and 29 are permanently connected to the respective outputs 45 and 46 of circuit 14 working into a code converter 15 which translates their digital data into to a code suitable for handling by a display device 16. The latter can comprise gasfilled tubes, solid-state elements, liquid or luminescent crystals, filaments, or mechanically controlled panels of the drum or flat type. The display device indicates, for each vehicle whose message is stored, the distance De of the vehicle from the station, the degree of loading of the vehicle in the form, for example, of the number of available places, and the vehicular identification number, this latter item of information being optional as far as display is concerned, plus other data pertaining to local conditions.

In principle, the station equipment which has been described will apply to one route only. If several routes meet at one and the same station, then the latter, in addition to a common receiver, demodulator and demultiplexer, will comprise for each route a separate system incorporating a route comparator, a distance subtractor, a classification and storage circuit, and a display device. Discrimination between the different systems assigned to the several routes will be carried out, on the basis of the heading data contained in the messages, within the directional or route comparators 10.

Everything that has been said in the foregoing pertains to equipment which makes it possible to present certain data required by the users of public surface-transport facilities waiting at a station.

We have found that, by means of specific modifications, the same equipment can be utilized, again within the context of a public surface-transport route, to control the traffic lights at an intersection in order to facilitate traffic movement.

Figure 5:
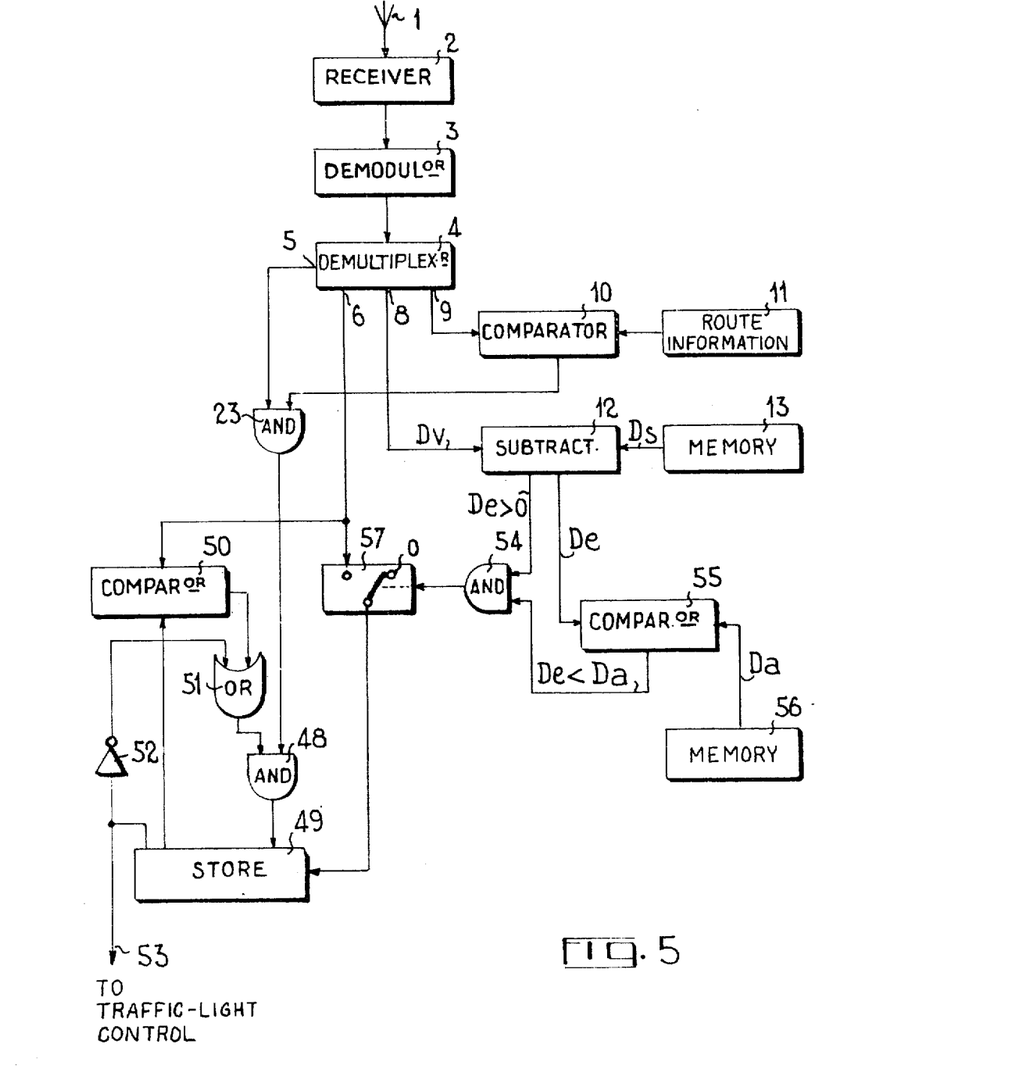
FIG. 5 is a schematic illustration of equipment at a fixed point, serving to control traffic lights.

FIG. 5 illustrates a schematic representation of the equipment for controlling the traffic lights at an intersection, in response to a message coming from a vehicle approaching the intersection.

We have pointed out above that the message from a vehicle contains a verification item verifying the correctness of the message, a route item indicating the direction in which the vehicle is traveling, a distance item Dv, defined for example with reference to the departure point of the route, an identification item indicating the number of the vehicle transmitting the message, and a leading item indicating its occupancy. Except for this last item, the same information is also pertinent insofar as the control of traffic lights at intersections is concerned, yet in this context its utilization will be subjected to a further condition. This consists in a comparison of the distance De, separating the transmitting vehicle from the fixed monitoring point, with a distance Da, referred to as the zone of action, within which the vehicle will have to be located in order to have any influence upon the operation of the traffic lights.

Figure 6:
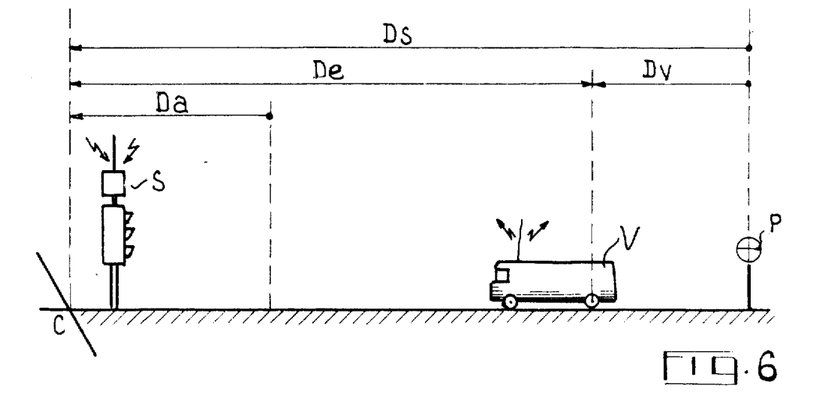
FIG. 6 is a graph indicating the various data referred to in connection with FIG. 5.

FIG. 6 indicates in a schematic fashion the various distances which have been referred to. A vehicle V, in the course of its progress, is at a distance Dv from its starting point P and registers this distance. The distance De is a here measured from an intersection C guarded by a set of multicolored traffic lights S, this distance De being obtained by subtraction of the traveled distance Dv from the known distance Ds separating the intersection from the starting point P; distance Da represents the zone of action, extending from intersection C.

The equipment at the intersection, shown in FIG. 5, comprises, like that of FIG. 1, a receiving antenna 1 working into a receiver 2, a demodulator 3 and a demultiplexer 4. The route information appearing at the output 9 of the demultiplexer is applied to a route comparator 10 where it is compared with a fixed parameter, supplied by memory 11, representing the route on which the intersection is located, in terms of a fixed point which may be the end of the route. The result of this comparison, which we will assume to be correct, is supplied to an AND-gate 23 which receives from the demultiplexer via output 5 the information that the message is correct and therefore acceptable. The AND-gate 23 works into an input of an AND-gate 48 controlling access to a store 49.

The vehicle number appearing at the output 6 of the demultiplexer 4 is compared with the number of the vehicle whose message has just been stored, in a comparator 50, and the result of this comparison is applied to an OR-gate 51 which in addition is supplied, through an inverter 52, with a signal indicating that the store 49 is free. The OR-gate 51 energizes the second input of the AND-gate 48. The leading of the store 49 is indicated by a signal appearing at 53, which is directed to the control of transit of the protected monitoring point such as the intersection C.

However, before the store 49 supplies this control signal, other operations have to be carried out, some of which have already been described earlier.

Thus, the demultiplexer 4, at its output 8, produces signal Dv which for example represents the distance traveled by the vehicle from its point of departure. A subtractor circuit 12 subtracts the distance Ds, a parameter stored in memory 13, which is equal to the distance separating the origin P (FIG. 6) of the route and the point C where the message is picked up and processed. The subtractor 12 produces a distance De representing the separation of the vehicle in question from the intersection. This value De must be positive in order to be passed for processing, and the data information is applied to an AND-gate 54 whose other input is connected to the output of a comparator circuit 55 which compares the distance De received from circuit 12 with a parameter Da stored in a memory 56 to define the aforedescribed zone of action within which a vehicle mut be located in order to have an influence upon the lights at the intersection being approached. In this case, action is initiated if the comparator 55 determines that the value De is less than Da.

The AND-gate 54 then controls the opening of a gate 57 which passes the identification number of the vehicle in question, located inside the zone of action D$a$, and transmits it to the store 49 in the event that the AND-gate 48 giving access to that store is conductive.

It should be pointed out that the conditions of access of the store are simpler in the present case than in the case shown in FIG. 1 where, for the display of certain data, other conditions have to be taken into account which are irrelevant to the control of traffic lights of an intersection; all that is required here is the presence of a vehicle inside the zone of action D$a$.

The access to the store 49 is given whenever that store is free or in the case where there is agreement between the number of the transmitting vehicle and that of the vehicle whose message is already stored, always subject to proper verification of the received message and the direction of travel by means of AND-gate 23.

Thus, it is only necessary to store the vehicle number. The signal indicating occupation of the store 49 can be obtained from the condition that the contents of the store are other than zero, or from the detection of a supplementary bit added for this purpose to the message produced by the demultiplexer.

It has been assumed in the foregoing that the mere presence of a vehicle within the zone of action Da of the intersection C is sufficient to control the lights, so that the presence of other vehicles in this zone would not modify this control. Depending upon the mode of operation of this light control, which may be sensitive to the presence of several vehicles in its zone of action, it may be necessary to provide as many classifying and storage circuits in accordance with FIG. 4 as there are vehicles. This does not modify the basic principle of the invention, however.

As in the case of the display of data at a station, the control of the traffic lights at an intersection can be extended, if desired, to several routes which may have that intersection in common.

In this case, the section comprising antenna 1, receiver 2, demodulator 3 and demultiplexer 4 is common to all the pieces of equipment which, for each route, will comprise a system constituted by a route comparator, a distance subtractor, a distance comparator, and a classification and storage circuit.

The various signals of vehicular presence supplied by these pieces of equipment will be applied to the light-controlling device, which, in accordance with local requirements, will establish certain priorities.

As will be apparent from FIGS. 3 and 5, the signal from arithmetic means 12 representative of distance De is compared in each instance with a signal from a data source representing a reference distance, this source being the read-out means 26'' or 29'' in the first instance and the memory 56 in the second instance. In either case, a comparison means 31, 38 or 55 inhibits the registration of the vehicular distance De if its magnitude exceeds that of the reference distance.

What is claimed is:

1. A system for automatically monitoring a plurality of surface vehicles equipped with transmitting means for intermittently sending out messages including positional data indicating the distance Dv of the vehicle, along a predetermined route, from a fixed reference point common to all vehicles, comprising:

receiving means located at a transit point along the route of said vehicles for picking up the transmitted messages;

data-supply means at said transit point for indicating the distance Ds thereof from said reference point;

data-supply means at said transit point connected to said receiving means and to said arithmetic means for calculating from said distances Dv and Ds the sign and magnitude of the instantaneous distance De of the vehicle from said transit point;

storage means at said transit point connected to said arithmetic means for registering the magnitude of the vehicular distance De in response to a sign of said vehicular distance De indicating that the vehicle is approaching said transit point; and output means connected to said storage means for revealing the approach of a vehicle.

2. A system as defined in claim 1 wherein different vehicles move along several routes past said transit point, said storage means being assigned to vehicles traveling over only one of said routes identified by heading data transmitted as part of each message, further comprising discriminating means at said transit point connected to said receiving means for detecting said heading data and for enabling said storage means to register said vehicular distance De.

3. A system as defined in claim 1, further comprising a data source at said transit point indicating a reference distance Da and comparison means at said transit point connected to said arithmetic means and to said data source for determining the relative magnitudes of said vehicular distance and said reference distance, said storage means being controlled by said comparison means to register the magnitude of said vehicular distance De only upon the latter magnitude being less than said reference distance.

4. A system as defined in claim 3 wherein said data source comprises read-out means for said storage means carrying distance information registered therein, and access means controlled by said comparison means for enabling the contents of said storage means to be modified on arrival of a message from a vehicle whose distance from said transit point is less than a previously registered vehicular distance De.

5. A system as defined in claim 3 wherein the messages transmitted by each vehicle include an identification code, said storage means being further connected to said receiving means for registering the identification code of an approaching vehicle together with the magnitude of said vehicular distance De thereof.

6. A system as defined in claim 5, further comprising a comparator connected to said storage means and to said receiving means, and access means controlled by said comparator for enabling the contents of said storage means to be updated on arrival of a subsequent message from a vehicle whose identification code is already registered in said storage means.

7. A system as defined in claim 5 wherein said reference distance Da has a fixed value and said transit point is a traffic-control post, said output means comprising a source of control signals for a traffic light at said post responding to the presence of an approaching vehicle within a zone of action represented by said reference distance.

8. A system as defined in claim 3 wherein said transit point is a passenger station along a route traveled by said vehicles, said output means including local display means for indicating the magnitude of said vehicular distance De.

9. A system as defined in claim 8 wherein said storage means comprises a first store and a second store, and a preference circuit for loading said first store before loading said second store.

10. A system as defined in claim 9 wherein said data source comprises first read-out means of said first store and second read-out means of said second store carrying distance information respectively registered therein, said comparison means including a first comparison circuit connected to said arithmetic means and to said first read-out means and a second comparison circuit connected to said arithmetic means and to said read-out means, said first store being provided with first access means controlled by said first comparison circuit for enabling the contents of said first store to be modified on arrival of a message from a vehicle whose distance De from said transit point is less than a vehicular distance $De_1$ registered in said first store, said second store being provided with second access means controlled by said second comparison circuit for enabling the contents of said second store to be modified on arrival of a message from a vehicle whose distance $De$ from said transit point is less than a vehicular distance $De_2$ registered in said second store.

11. A system as defined in claim 10, further comprising a first comparator connected to said first store and to said receiving means, and a second comparator connected to said second store and to said receiving means, said first access means being additionally controlled by said first comparator for enabling the contents of said first store to be updated regardless of vehicular distance on arrival of a subsequent message from a vehicle whose identification code is already registered in said first store, said second access means being additionally controlled by said second comparator for enabling the contents of said second store to be updated regardless of vehicular distance on arrival of a subsequent message from a vehicle whose identification code is already registered in said second store.

12. A system as defined in claim 11 wherein said preference circuit includes blocking means controlled by said first comparator for preventing entry in said second store of data from a vehicle whose identification code is registered in said first store.

13. A system as defined in claim 12 wherein said preference circuit further includes clearing means jointly controlled by said first and second comparators for emptying said second store upon concurrent entry of the same identification code in both stores.

14. A system as defined in claim 11 wherein said preference circuit includes a lead energized by said receiving means with a timing pulse of predetermined duration upon the arrival of a message from any vehicle, and delay means for feeding said timing pulse successively to said first access means and to said second access means, both said access means being inoperative in the absence of said timing pulse.

15. A system as defined in claim 14 wherein said delay means comprises a first stage with a delay less than said duration between said receiving means and said first access means and a second stage with a delay greater than said duration between said first stage and said second access means.

* * * * *